United States Patent
Forrest, Jr.

(10) Patent No.: US 7,303,069 B2
(45) Date of Patent: Dec. 4, 2007

(54) PRE-MOISTENED FIBER OPTIC COMPONENT CLEANING TOOL WITH INTEGRATED PLATEN

(75) Inventor: Edward J. Forrest, Jr., Marietta, GA (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 11/162,331

(22) Filed: Sep. 7, 2005

(65) Prior Publication Data

US 2006/0266670 A1    Nov. 30, 2006

Related U.S. Application Data

(63) Continuation-in-part of application No. 11/137,012, filed on May 25, 2005.

(51) Int. Cl.
*B65D 81/24*    (2006.01)
(52) U.S. Cl. ............... 206/210; 206/494; 221/63
(58) Field of Classification Search ............... 206/233, 206/581, 494, 812, 207, 210; 221/33, 45, 221/52, 63, 303, 306
See application file for complete search history.

(56) References Cited

U.S. PATENT DOCUMENTS

| | | | |
|---|---|---|---|
| 579,850 A | 3/1897 | Uhlmann | |
| 2,585,061 A | 2/1952 | Wester, Jr. | |
| 2,880,442 A | 4/1959 | Shelby | |
| 3,613,146 A | 10/1971 | Oviatt | |
| 4,002,264 A | 1/1977 | Marchesani | |
| 4,101,026 A | 7/1978 | Bonk | |
| 4,152,803 A | 5/1979 | Gersin et al. | |
| 4,171,047 A | 10/1979 | Doyle et al. | |

(Continued)

FOREIGN PATENT DOCUMENTS

EP    0364896    4/1990

(Continued)

OTHER PUBLICATIONS

PCT International Search Report for PCT/US2006/019806 dated Nov. 7, 2006.

*Primary Examiner*—Luan K Bui
(74) *Attorney, Agent, or Firm*—Mark W. Croll; Donald J. Breh; Levenfeld Pearlstein, LLC

(57) ABSTRACT

A fiber optic component cleaning tool includes a container defining a body having an outer wall, a sealed bottom wall and an open end, the open end defines a periphery. A compliant, large work surface is disposed on at least a portion of the outer wall. A plurality of cleaning wipes are disposed inside the container. The wipes are pre-moistened with a solvent. A seal extends over the container opening and is sealed to the container at the periphery. The seal has a frangible portion therein to define an opening. A lid is fitted to the container over the open end. The lid has an opening for cooperating with the frangible portion of the seal. Cleaning wipes are fed from the inside of the container through the opening in the seal and the opening in the lid, and are placed on the work surface for cleaning the fiber optic component. The wipes are formed from a non-woven material such as a blend of a natural and a synthetic material.

16 Claims, 1 Drawing Sheet

U.S. PATENT DOCUMENTS

| | | |
|---|---|---|
| 4,306,687 A | 12/1981 | Hadtke |
| 4,333,979 A | 6/1982 | Sciaraffa et al. |
| 4,353,480 A * | 10/1982 | McFadyen .................... 221/63 |
| 4,601,938 A | 7/1986 | Deacon et al. |
| 4,741,944 A | 5/1988 | Jackson et al. |
| 4,873,728 A | 10/1989 | Bono |
| 5,220,703 A | 6/1993 | Kanayama et al. |
| 5,346,064 A * | 9/1994 | Rizzuto ....................... 221/63 |
| 5,467,893 A * | 11/1995 | Landis et al. ................. 221/63 |
| 5,522,939 A | 6/1996 | Light, Jr. et al. |
| 5,605,749 A | 2/1997 | Pike et al. |
| 5,656,361 A | 8/1997 | Vogt et al. |
| 5,874,160 A | 2/1999 | Keck |
| 6,091,875 A | 7/2000 | Lindsay, Jr. et al. |
| 6,098,239 A | 8/2000 | Vosbikian |
| 6,109,430 A * | 8/2000 | Bando et al. ................ 206/494 |
| 6,158,614 A * | 12/2000 | Haines et al. ................. 221/63 |
| 6,182,858 B1 * | 2/2001 | Hartog ......................... 221/63 |
| 6,364,101 B1 * | 4/2002 | Schultz ....................... 206/494 |
| 6,500,353 B1 | 12/2002 | Blyler, Jr. et al. |
| 6,523,690 B1 * | 2/2003 | Buck et al. ................. 206/494 |
| 6,550,634 B1 * | 4/2003 | Alegre De Miquel et al. ........................... 221/63 |
| 6,553,169 B2 | 4/2003 | Fabian |
| 6,584,258 B2 | 6/2003 | Thompson et al. |
| 6,594,437 B1 | 7/2003 | Nicolas |
| 2003/0080018 A1 * | 5/2003 | Nally ......................... 206/494 |

FOREIGN PATENT DOCUMENTS

| | | |
|---|---|---|
| EP | 1048963 | 2/2000 |
| EP | 0982237 | 3/2000 |
| EP | 1384528 | 1/2004 |
| TW | 382992 | 5/1988 |
| WO | WO 98/03713 | 1/1998 |
| WO | WO 00/56201 | 9/2000 |

* cited by examiner

PRE-MOISTENED FIBER OPTIC COMPONENT CLEANING TOOL WITH INTEGRATED PLATEN

CROSS-REFERENCE TO RELATED APPLICATION DATA

This application is a continuation-in-part of U.S. patent application Ser. No. 11/137,012, filed May 25, 2005, pending.

BACKGROUND OF THE INVENTION

The present invention is directed to a fiber optic component cleaning tool. More particularly, the present invention pertains to a pre-moistened fiber optic component cleaning tool having a plurality of pre-moistened cleaning cloths in a container having a work surface or platen thereon.

Fiber optic transmission rates have increased from one gigabyte per second to a contemporary standard of ten gigabytes per second. Several networks predict transmission rates will reach forty gigabytes per second in the near future and work continues to achieve transmission rates on the order of petabytes and terabytes per second.

To achieve, maintain, and even surpass these transmission rates, the transmission media (e.g., fiber optic conductors), must be fabricated and maintained to exacting standards and tolerances. As such, during fabrication and manufacturing, fiber optic component end faces frequently become contaminated with dirt, dust, oil, grease, and other debris, and cleaning these end faces preserves the accuracy of high-speed transmissions. Moreover, the end faces of the conductors must be free of scratches, burrs, and the like to maintain the standards necessary for these high transmission rates. The same standards of cleanliness are equally essential for installation, maintenance and test procedures. Cleanliness is critical for VoIP (voice over internet protocol) and TVoIP (television over internet protocol), as well as the expansion of standard data, television and additional services that are anticipated and planned to be added to high capacity fiber networks.

Many devices are used to clean fiber optic end faces, with differing degrees of success. Minimizing and/or avoiding linting is critical in that fibrous material obstructing an end face can cause loss of laser light transmission. As such, paper products and other flaking materials are not preferred because they can generate lint. In addition, paper products generally cannot be used with a wet-cleaning technique. Wetting paper cleaning products causes them to shred, exacerbating the linting problem.

As to wet cleaning, it has been found that the use of a liquid, such as a solvent greatly increases the ability to clean the connectors while reducing the possibility of scratching. However, known cleaning devices (or kits) require the use of a dry wipe or towel with a separate solvent spray or other application. It is also generally accepted that excess solvent from "wet" cleaning can result in signal loss by virtue of residues that remain.

Accordingly, there exists a need for a fiber optic cleaning device incorporates a soft, large cleaning surface to reduce or eliminate residue on a connector end face. Desirably, such a cleaning device allows for wet cleaning and contains pre-wetted cleaner (towels) in a self-contained package. More desirably, such a wiping tool delivers a moderated quantity of solvent (to prevent excess moisture from attracting airborne contaminants).

BRIEF SUMMARY OF THE INVENTION

A fiber optic component cleaning tool includes a container defining a body having an outer wall, a sealed bottom wall and an open end. The open end defines a periphery. A soft, relatively large work surface or platen is positioned on at least a portion of the outer wall. A present container is a molded plastic.

A plurality of cleaning wipes are disposed inside the container. The wipes are pre-moistened with a solvent. In a preferred tool, the container has a cylindrical shape and the cleaning wipes are in a roll form, fed from a center of the roll. The wipes are detachable from adjacent cleaning wipes (by, for example, perforations). The wipe material is a non-woven or a woven, natural or synthetic material. Preferably, the wipes are non-woven material formed from a blend of a natural material and a synthetic material, such as a polyester/cellulose blend.

The wipes can be formed, at least in part, from a hydrophilic material and can be manufactured having an absorbent core and a non-absorbent outer portion, such as with a hydrophilic core material and a hydrophobic material outer material such that the wipe is relatively dry to the touch and expels solvent when pressure is applied to the wipe. Advantageously, such a structure dries the surface as it is cleaned.

With respect to the container, a seal extends over the container opening and is sealed to the container at the periphery. The seal has a frangible portion to define an opening in the seal. The seal can be formed having an X-shape. A lid is fitted to the container over the open end. The lid has an opening for cooperating with the frangible portion of the seal. The lid opening can also be formed having an X-shape that is staggered or offset (e.g., rotated) from the seal opening. This positioning of the seal and lid openings retards evaporation of the solvent. The seal further enables addition of solvent, for example using an aerosol spray and extension tube, in the event that the solvent in the container evaporates.

The lid can include a cover to seal or semi-seal (e.g., overlie) the opening in the lid to further reduce evaporation of the solvent.

The cleaning wipes are fed from the inside of the container (and the center of the core of the roll) through the opening in the seal and the opening in the lid, and are placed on the work surface for cleaning the fiber optic component.

The work surface or platen is formed of a non-flaking material, preferably a tight, closed cell material, or a covered open cell matrix, such as neoprene. The work surface maybe square, rectangular or any desired shape, depending upon the size of the container and the labeling requirements. The work surface may be formed from raised strips to clean certain types of connectors such as MTP® and snap-fit shrouded connectors.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
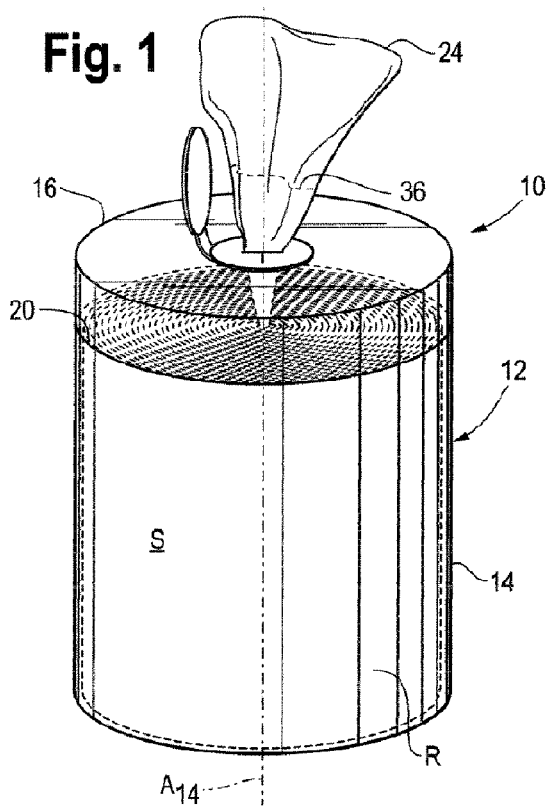
FIG. 1 is a perspective illustration of a pre-moistened fiber optic cleaning tool embodying the principles of the present invention, the container shown open with a wipe pulled partially therefrom.
Figure 2:
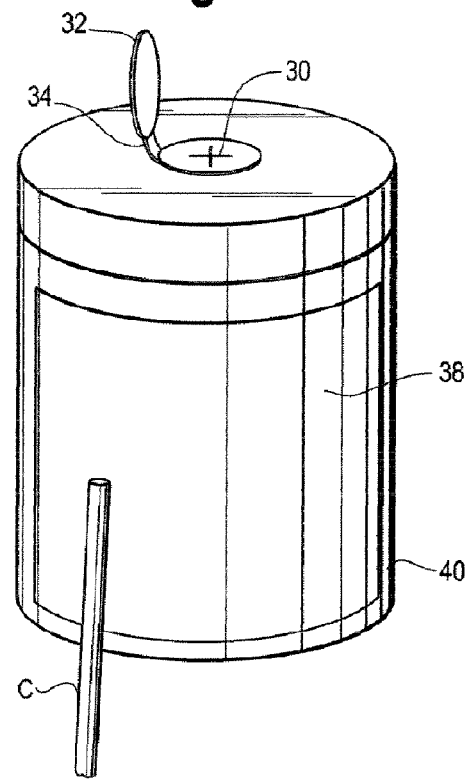
FIG. 2 is a perspective view of the container of FIG. 1 with the wipe removed for ease of clarity, and further showing the work surface.
Figure 3:
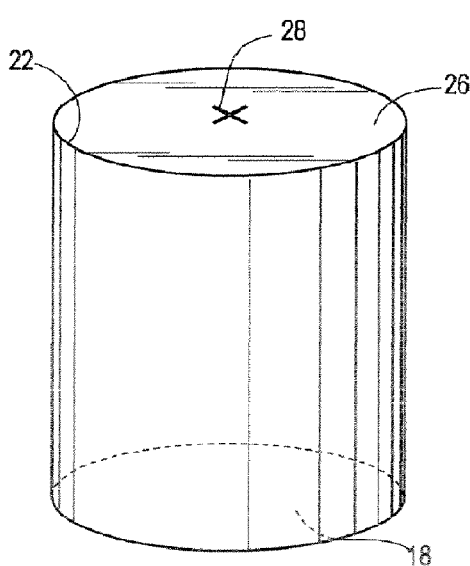
FIG. 3 is a perspective view of the container with the lid removed to show the container seal.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular FIG. 1 there is shown a pre-moistened fiber optic component cleaning tool 10 in accordance with the principles of the present invention. The cleaning tool 10 includes a container 12 having a body 14 and a lid 16. A present container body 14 has a barrel or cylindrical shape (having an axis A14) with a sealed bottom wall 18 and an open end 20 to which the lid 16 is fitted. The body open end 20 (opposite the sealed bottom wall 18) defines a periphery 22.

A plurality of wipes or towels 24 are disposed in the container 12. The wipes 24 are a non-woven, non-linting (or lint free) material and are pre-moistened or pre-wetted with a low vapor pressure, moderate to fast evaporating hydrocarbon solvent S. One suitable solvent is ELECTRO-WASH® MX, commercially available from ITW Chemtronics of Kennesaw, Ga. Such a cleaner is safe on plastics, is ozone safe, has a relatively low vapor pressure (to prevent blow-out of the sealed container), has a moderate evaporation rate (to increase cleaning power), removes organic and ionic soils, and leaves minimal to no residue. The solvent can be formulated from, for example, naphtha, ethanol, ethyl acetate and isopropanol. The solvent has generally accepted threshold limit values (TLV) to assure worker safety.

The non-linting wipes can be formed from any of a wide variety of materials. For example, the wipes can be formed from a polyester (or textured polyester)/cellulose blend. The wipes can also be formed from hydrophilic materials, such as superabsorbent polymer materials, such as acrylate (polyacrylate and polyacrylamide)-based superabsorbents, and the like. Other suitable materials for use in forming the wipes include poly(acrylic acid) and poly(methacrylic acid), poly(acrylamides), poly(vinyl ethers), maleic anhydride copolymers with vinyl ethers and alpha-olefins, poly(vinyl pyrrolidone), poly(vinylmorpholinone), and mixtures and copolymers thereof, natural and modified natural polymers, such as hydrolyzed acrylonitrile-grafted starch, acrylic acid grafted starch, methyl cellulose, chitosan, carboxymethyl cellulose, hydroxypropyl cellulose, and the natural gums, such as alginates, xanthan gum, locust bean gum and the like.

It is also anticipated that a material can be used that is absorbent, but that "feels" relatively dry to the touch, even when saturated or relatively saturated. Such a fiber can be manufactured to release the absorbed liquid when pressure is applied to the fiber. For example, such a fiber may include a hydrophilic core (such as one or more of the above-noted superabsorbent materials) with a porous outer coating or sheath of a hydrophobic material (such as a polypropylene or polyethylene based material). Such a material would have the advantage of "feeling" dry to the touch, while being capable of retaining and releasing the solvent (cleaning solution) when pressure is applied to the wipe (such by squeezing or pressing the wipe into a surface to be cleaned), or when pressure is exerted on the wipe surface by the end face of the fiber optic connector during the cleaning process.

The container 12 includes a seal 26 disposed at the open end 20 around the entire periphery 22 to prevent evaporation of the solvent. In a present tool 10, the seal 26 is foil or a foil and polymer laminate that covers the open end 20. The seal 26 includes an opening 28 therein through which the wipes 24 are pulled from the container 12. In a present seal 26, the opening 28 is formed as a frangible region 29 that is sealed until initial use. In this manner, the container 12 remains sealed until it is first used. This reduces evaporation of the solvent S.

Figure 4:
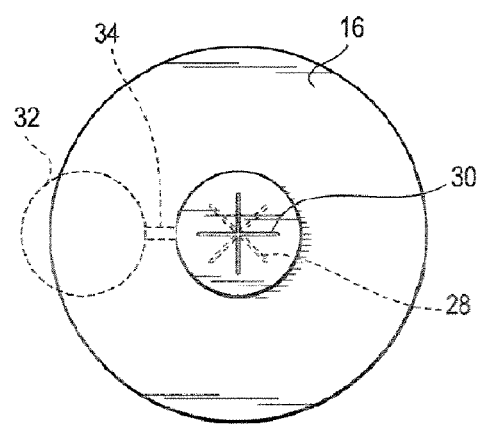
FIG. 4 is a top view of an exemplary lid showing the opening in the lid (and the cooperating opening in the seal in phantom lines).

The lid 16 also includes an opening 30 through which the wipes 24 are pulled upon use. In a present tool 10, the lid 16 includes an "X" shaped opening 30 and the seal 26 includes a frangible "X" shaped opening 28 that is opened (upon initial use). In a preferred tool 10, the seal "X" 28 and the lid "X" 30 are offset from one another (e.g., rotated relative to one another as seen in FIG. 4) so that the arms of the Xs 28, 30 to not overlie one another). This maximizes the seal between the wipes 24 (in the container 12) and the environs. With this staggered seal 28 30, evaporation of the solvent S is minimized after initial use of the tool 10 by reducing the environmental exposure of the pre-moistened wipes 24. The staggered seal 26/30 more readily enables the addition of solvent in the event that the wipes 24 become too dry to carry out the cleaning process. For example, an aerosol spray and extension tube can be used to add solvent S to the container 12.

The lid 16 can include a cover 32 that is fitted over the opening 30 to further reduce solvent evaporation. A preferred cover 32 is attached to the lid 16 by, for example, a plastic strip or tether 34 to maintain the cover 32 attached to the lid 16 to prevent inadvertently misplacing the cover 32.

The wipes 24 are present in roll R form in the container 12. The wipes 24 are dispensed or pulled from the inside (center) of the roll R, up through the seal opening 28 and the lid opening 30. Preferably, the wipes 24 are separable from adjacent wipes by, for example, perforations 36 between the wipes.

A present tool 10 includes a large, compliant cleaning surface or work surface 38 on a side 40 of the container body 14. The work surface 38 is formed from a non-flaking material. Preferably, the non-flaking material used for the work surface 38 is a tight, closed cell material, such as neoprene. Alternately, the work surface 38 can be formed from, for example, Buna-N (nitrile butyl rubber) vinyl or a like soft, resilient polymer. Essentially any soft, resilient material can be used. Desirable characteristics for the work surface 38 include liquid impermeability and chemical/solvent resistance. To this end, the work surface 38 (which can be formed as multiple strips) can be formed from a soft, resilient material having a protective layer adhered thereto or formed thereon, such as by forming a coextruded material or film. Such a work surface 38 is more fully described in Forrest, U.S. Pat. No. 6,865,770, commonly assigned with the present application and incorporated herein by reference.

The body 14 and lid 16 of the present tool 10 are preferably formed from readily available polymeric materials such as polypropylene (PP), polyethylene terephthalate (PET), polyethylene (PE) or the like. The materials may also be electrostatic discharging material.

In use, a fiber optic cable (end face) C is positioned on the work surface 38. The cable C can be held in place on the surface using one hand. A wipe 24 is then dispensed from the tool 10, and the cable C is cleaned as it is held on the surface 38. In that the wipe 24 is pre-moistened or pre-wetted, it is contemplated that additional solvent may not be necessary to properly clean the cable C, although it could be readily added. The present tool 10 configuration serves to provide a moderated quantity of solvent on the wipe 24. The moderated quantity tens to reduce the potential to attract airborne contaminants (by reducing the excess moisture in the wipe 24).

The use of a hydrophilic wipe material, as previously discussed, enables a preferred combination cleaning technique in which the end face of the connector is dried as solvent is administered.

The present tool 10 provides a compact, easy to use, self contained kit for cleaning fiber optic components. Having the pre-wetted or pre-moistened wipes 24 within a cost effective, sealed container 12 reduces the time and expense associated with component cleaning, and having the large work surface 38, permits carrying one tool (or kit) to effect fiber optic component cleaning. The work surface 38 of the present tool 10 is preferred to previous designs that use surfaces that are about one-eighth to one-tenth the size of the present surface 38.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fiber optic component cleaning tool, comprising:
    a container defining a body having an outer wall, a sealed bottom wall and an open end, the open end defining a periphery, the container being formed from a first material;
    a large, compliant work surface on at least a portion of the outer wall, the work surface being formed from a second material different from the first material, the second material being a non-flaking, tight, closed cell material or a covered open cell matrix;
    a plurality of cleaning wipes disposed inside the container, the wipes being pre-moistened with a solvent, the wipes being formed from a non-woven material and being formed, at least in part, from a hydrophilic material;
    a seal extending over the container body open end and sealed to the container at the periphery, the seal having a frangible portion therein to define an opening in the seal;
    a lid fitted to the container over the open end, the lid having an opening therein for cooperating with the frangible portion of the seal,
    wherein cleaning wipes are fed from the inside of the container through the opening in the seal and the opening in the lid, and are placed on the work surface for cleaning.

2. The cleaning tool in accordance with claim 1 wherein the container has a cylindrical shape and the plurality of cleaning wipes are in a roll form, fed from a center of the roll.

3. The cleaning tool in accordance with claim 2 wherein each of the plurality of cleaning wipes is detachable from adjacent cleaning wipes.

4. The cleaning tool in accordance with claim 1 wherein the container is formed of molded plastic.

5. The cleaning tool in accordance with claim 4 wherein the plastic is an electrostatic discharging material.

6. The cleaning tool in accordance with claim 1 wherein the frangible portion in the seal is formed having an X-shape and wherein the opening in the lid has an X-shape.

7. The cleaning tool in accordance with claim 6 wherein the X-shaped frangible portion and the X-shaped lid opening are staggered relative to one another.

8. The cleaning tool in accordance with claim 7 wherein the work surface is formed of neoprene.

9. The cleaning tool in accordance with claim 1 wherein the plurality of cleaning wipes is placed on a roll.

10. The cleaning tool in accordance with claim 1 including a cover fitted over the lid opening.

11. The cleaning tool in accordance with claim 10 wherein the cover is attached to the lid.

12. The cleaning tool in accordance with claim 11 wherein the cover is attached to the lid by a flexible strip.

13. The cleaning tool in accordance with claim 1 wherein the cleaning wipes are formed from a blend of a natural material and a synthetic material.

14. The cleaning tool in accordance with claim 13 wherein the wipes are formed, at least in part, from a polyester/cellulose blend.

15. The cleaning tool in accordance with claim 1 wherein the wipes are formed so as to have an absorbent core and a non-absorbent outer portion.

16. The cleaning tool in accordance with claim 15 wherein the absorbent core is a hydrophilic material and the non-absorbent outer portion is a hydrophobic material such that the wipe is relatively dry to the touch and expels solvent when pressure is applied to the wipe.

* * * * *